B. M. KENT.
ROLL GAUGING MACHINE.
APPLICATION FILED JULY 19, 1920.

1,406,193.

Patented Feb. 14, 1922.

UNITED STATES PATENT OFFICE.

BERT M. KENT, OF CLEVELAND, OHIO, ASSIGNOR TO THE STANDARD PARTS COMPANY, OF CLEVELAND, OHIO, A CORPORATION OF OHIO.

ROLL-GAUGING MACHINE.

1,406,193.

Specification of Letters Patent. Patented Feb. 14, 1922.

Application filed July 19, 1920. Serial No. 397,377.

*To all whom it may concern:*

Be it known that I, BERT M. KENT, a citizen of the United States, and a resident of Cleveland, county of Cuyahoga, State of Ohio, have invented certain new and useful Improvements in Roll-Gauging Machines, of which the following is a specification.

This invention relates to apparatus for assorting articles according to their varying dimensions, so that articles of the same size, within certain limits, will be segregated.

One of the objects of the invention is to provide a machine especially adapted for gauging tapered articles, such as tapered rollers for bearings, and a further object is to provide such a machine capable of gauging the taper of the articles, as well as the diameter.

A further object of the invention is to provide a machine of this character, which will automatically feed the articles from a hopper containing the same, gauge them and assort them into the different sizes desired.

A further object of the invention is to provide a machine of this character, which will be comparatively simple and which will be reliable in its operation and capable of gauging the articles accurately within narrow limits.

Other objects of the invention and the features of novelty will be apparent from the following description, taken in connection with the accompanying drawings, which illustrate one embodiment of my invention.

In general, the machine comprises devices on the periphery of a revolving table or work-carrier, which carry the articles to be gauged past a series of gauging devices, each of which will be actuated by articles of a particular size and cause the articles so actuating it to be discharged into a receptacle. Feeding mechanism for automatically delivering the articles to the carrying devices, is provided.

Figure 1:
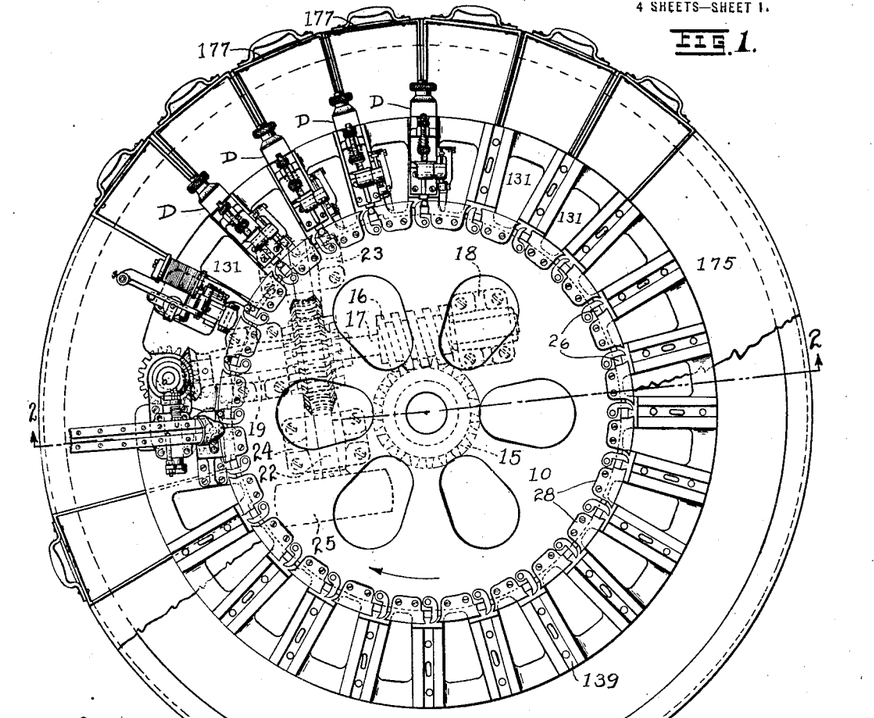
Figure 1 is a plan view of the machine, with certain parts omitted for convenience of illustration and to simplify the drawing.
Figure 2:
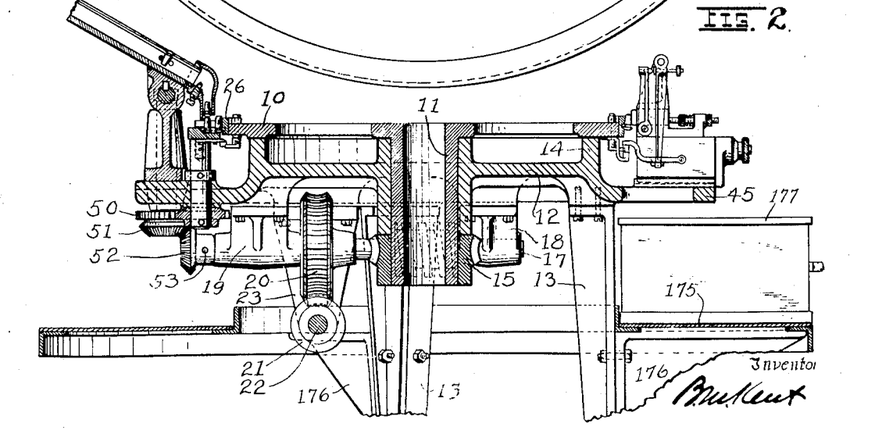
Fig. 2 is a transverse section on the line 2—2 of Fig. 1, with the base of the machine broken away.

Referring to the drawings, and particularly to Figs. 1 and 2, it will be observed that the machine illustrated consists of a revolving table or work-carrier 10 having a vertically disposed spindle 11, which is journaled in a frame 12 mounted on legs 13. The table 10 is supported, near its periphery, by an up-standing flange 14 on the frame 12, so that there will be practically no vibration in the carrier 10. At its lower end, the spindle 11 carries a worm gear 15 which meshes with a worm 16 on the shaft 17. The shaft 17 is mounted in bearings 18 and 19 which depend from the under side of the frame 12, and carries a worm gear 20 which meshes with a worm 21 on the shaft 22, the latter being supported in bearings 23 and 24 which also depend from the under side of the frame 12. The shaft 22 is provided with a pulley 25, or other suitable means, by which the shaft will be driven from any available source of power.

The arrangement of the worm gear 20 and worm 21 in combination with the worm gear 15 and the worm 16 effects a very considerable reduction in the speed from the shaft 22 to the work-carrier 10, so that the speed of the latter may be as low as two or three revolutions per minute, or such other speed as will permit the various mechanisms to function properly.

On the periphery of the table 10, there is secured a series of circumferentially spaced T-shaped blocks 26, each of which is secured by two screws 27, and arranged between the blocks 26 and secured to the upper side of the table 10, by screws 29, is a series of blocks 28, which project beyond the periphery of the table 10, with the corner thereof adjacent the blocks 26 formed as a stationary jaw or gripper 30 to cooperate with the movable jaw or gripper 31, to hold the article A in position to be gauged. The parts 30 and 31 have their article-gripping faces arranged at such angles as to securely hold the article against the block 26. The movable jaw or gripper 31 is secured on a vertical pivot 32, by means of a pin 33, the pivot being journaled in the table 10 and carrying on its lower end a finger 34, which may be pinned, or otherwise secured, to the pivot. A coil spring 35, having one end attached to the table 10 and the other end attached to the finger 34, tends to close the movable gripper 31 on the article A, to hold the latter.

The article A, as shown in the drawings, has an enlarged head and, in order that the body of the article may contact throughout its length with the face of the block 26, a groove 36 is provided in the face of the block, to receive the head of the article and also to provide a beveled shoulder 37 against which the outer surface of the head may abut, to accurately position the article vertically. The body of the article is also tapered, and I prefer to bevel the faces of the blocks 26, so that the outermost element of the body of the article will be in a plane normal to the plane of rotation of the table 10.

Figures 3, 4:
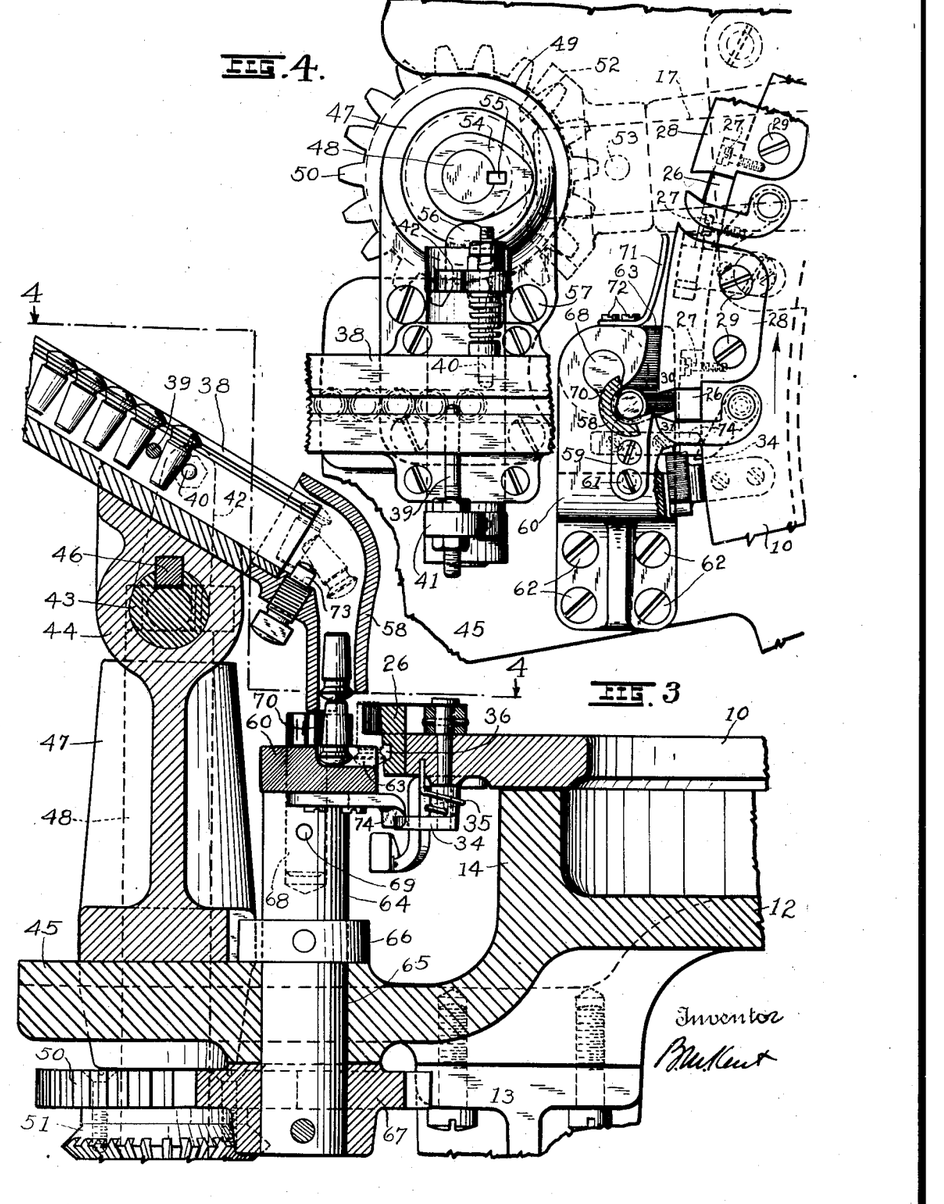
Fig. 3 is an enlarged detail view of a portion of Fig. 2.
Fig. 4 is a view as seen from the line 4—4 of Fig. 3.

Referring now to Figs. 3 and 4, it will be observed that the feeding mechanism comprises a chute 38 into which the articles may be fed, by any suitable means, such as from a hopper and by the mechanism shown in the Bingham Patent No. 1,311,590, of July 29, 1919. From the chute 38, the articles are allowed to pass one at a time, by any suitable mechanism, such as the fingers 39 and 40 which are, respectively, carried on the arms 41 and 42 on the reciprocating rod 43. The rod 43 is carried in a bracket 44 mounted on a circumferential shelf 45 on the frame 12. A key or feather 46 prevents the rod 43 from rotating in the bracket 44. For convenience, the chute 38 is mounted on the upper end of the bracket 44, and this bracket has an extension 47 in which there is journaled the upright shaft 48, the shelf 45 of the frame 12 being recessed as indicated at 49 to permit the extension 47 to project below the shelf.

On the lower end of the shaft 48 there is a spur gear 50 and a bevel gear 51, the latter meshing with a bevel gear 52 which is secured on the end of the shaft 17 by a pin 53, or otherwise.

On the upper end of the shaft 48 there is a cam 54 which is secured by a key 55 and cooperates with the end 56 of the reciprocating rod 43 to move said rod in one direction, the rod being returned by the coil spring 57 on the finger 40 between the arm 42 and the side of the chute 38.

A mouthpiece 58 is arranged at the end of the chute 38 to receive the articles from the latter and has at its lower end a foot 59, which is secured to a bracket 60 by screws 61. The bracket 60 is secured on the shelf 45 by screws 62, and the upper surface of the bracket is provided with a recess 63, to receive and act as a guide for the head of the article, while the latter is being transferred from the mouthpiece 58 to its position against one of the blocks 26 on the table 10.

A vertical shaft 64 is journaled at 65 in the shelf 45 and is provided above the shelf with a collar 66 and below the shelf with a spur gear 67 which meshes with the gear 50. An extension 68, of reduced diameter, is provided at the upper end of the shaft 64, by drilling an opening in the end of the shaft and inserting the extension and securing it by means of a pin or set screw 69. The upper end of the extension 68 is formed with a cam 70, adapted to engage the article at the lower end of the mouthpiece 58 and move it into the jaws 30 and 31 on the table 10.

The table 10 rotates in the direction of the arrows on Figs. 1 and 4, and when the article is moved into the jaws 30 and 31, by the cam 70, it will be carried forward into contact with a resilient wiper 71, which will press the article firmly against the block 26. The wiper 71 is secured on the end of the bracket 60, by screws 72.

In the operation of the feeding mechanism, the gears will rotate the shaft 48 once for each work-holder on the table 10, so that with twenty-four work-holders on the table 10, as shown in Fig. 1, the shaft 48 will make twenty-four revolutions for each revolution of the table. The gears 50 and 67 should have the same number of teeth, so that the shaft 64 will make one revolution for each revolution of the shaft 48. This will cause an article to be fed to every work-holder as it comes into position in front of the feeding mechanism and will also insure the feeding of the articles from the chute 38 at the proper speed. It will be noted that the articles in the chute 38 have their heads upward, whereas they are fed to the work-holders on the table 10 with the heads downward. This reversal is effected by an obstruction at the end of the chute 38, this obstruction being in the form of a set screw 73, with which the lower end of the article will engage, so as to cause the article to tumble, as indicated in Fig. 3. The set screw 73 is adjustable, so as to project into the path of the articles the requisite amount, to cause them to tumble, as indicated.

The coil springs 35 normally hold the gripper 31 in the closed position, and it is necessary to open this gripper just prior to the feeding of the article. This is accomplished by means of a small arm 74 which projects from the under side of the bracket 60 into the path of the finger 34 so as to cause the latter to swing and the jaw 31 to be moved to the open position. When the finger 34 is carried past the arm 74, the finger will be released, this occurring after the article has been delivered between the jaws 30 and 31, and the spring 35 will then close the gripper 31 on the article, as previously described.

The mechanism so far described is for the purpose of delivering the articles in succession to the holders or grippers on the table 10, which carry them in succession past the various guages for doing the assorting. Where it is desired to gauge the taper of the articles, one or more taper gauges may be provided adjacent the feeding mechanism, so that the articles will be presented to these mechanisms immediately after being delivered to the holders or grippers on the table 10. In the drawings, I have illustrated a single taper gauging mechanism, which will assort the articles into two kinds, so far as their taper is concerned. This mechanism will cause all articles whose taper departs from predetermined limits, to be released from the grippers, but permits all of the other articles whose taper comes within the predetermined limits, to continue on, for presentation to the diameter gauging mechanism, to be hereinafter described.

Figures 5, 6, 10:
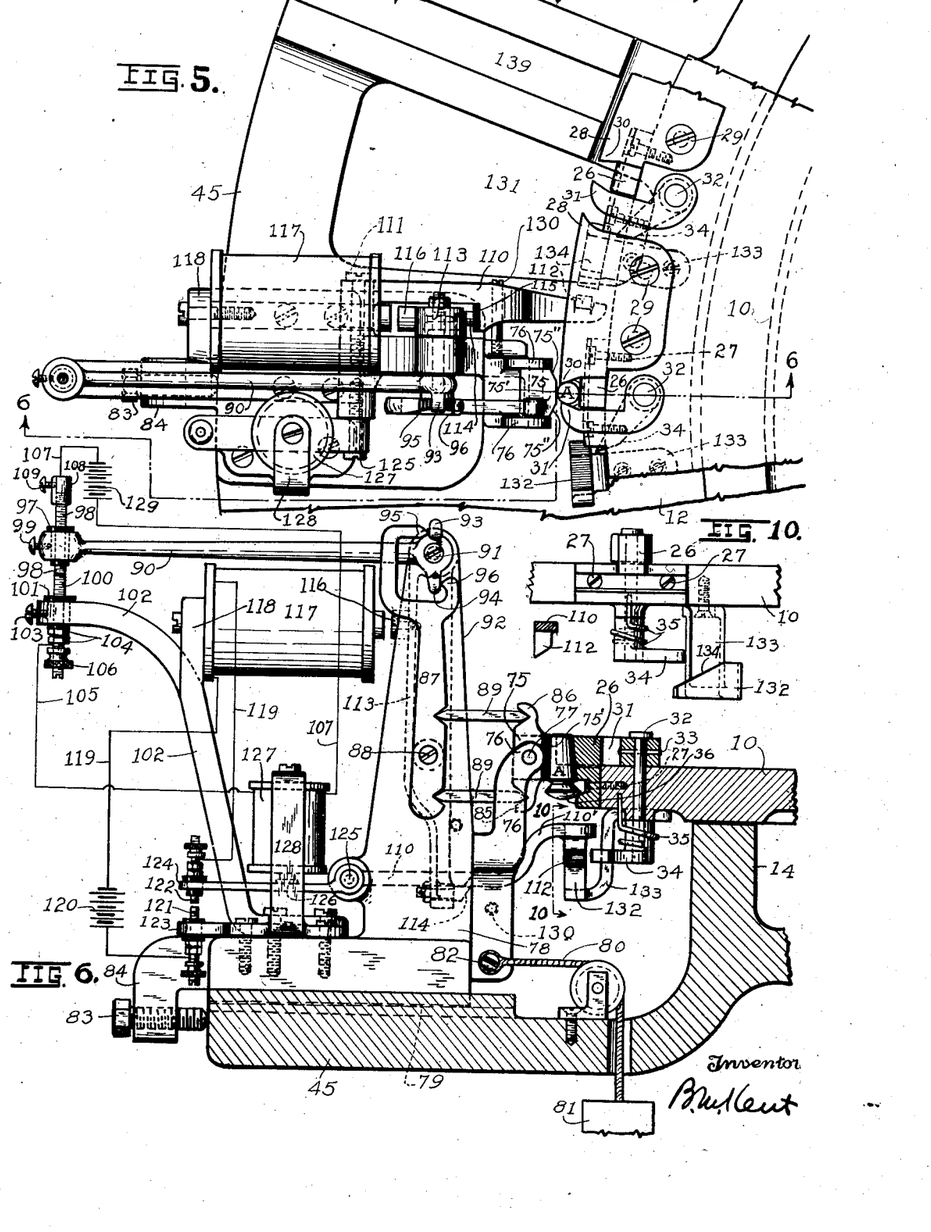
Fig. 5 is an enlarged fragment of Fig. 1, to illustrate the taper gauging mechanism.
Fig. 6 is a transverse section on the line 6—6 of Fig. 5.
Fig. 10 is a detail section on line 10—10 of Fig. 6.

The taper gauging mechanism, as illustrated in Figs. 5 and 6, comprises a gauging block 75, which is pivotally mounted in a yoke 76, the axis of the pivot 77 being, preferably, located substantially in the plane at the middle of the face 75' of the block which contacts with the article. The face 75' is, preferably, ground to a curvature substantially about the axis of the table 10, and the side portions of this face are, preferably, deflected away from the path of the article, as indicated at 75''. The yoke 76 is formed on a sliding member 78, the base of which has a tongue and groove connection with the shelf 45, as indicated at 79. A cable 80, carrying a weight 81, is attached to the slide 78, as indicated at 82, the effect of this weight being to draw the slide toward the table 10, so that the block 75 will have a good contact with the article. The movement of the slide 78 toward the table 10 is limited by an adjustable screw 83, carried in a bracket 84 on the outer side of the slide 78.

The block 75 is provided with two oppositely extending arms 85 and 86, which are, respectively, connected with a lever 87 mounted on a pivot 88, by means of links 89. The pivot 88 is, preferably, in alignment with the pivot 77, so that the movements of the lever 87 will be in an exact relation to the rocking movement of the block 75. A lever 90, pivoted at 91 on the supporting bracket 92 which is a part of the slide 78, has arms 93 and 94 arranged on opposite sides of the pivot 91 and engaged, respectively, by the forks 95 and 96 of the free end of the lever 87, so that movement of the lever 87 in either direction will cause the lever 90 to be raised, as seen in Fig. 6. The distances of the points of contact of the forks 95 and 96 with the arms 93 and 94, respectively, from the pivot 91 are proportioned in accordance with the distances of these points from the pivot 88, so that the angular movements of the lever 90 will be in exact relation to the angular movements of the lever 87, irrespective of the direction of movement of the latter.

At its free end, the lever 90 carries an insulator 97 through which a contact member 98 is threaded, the insulator and the contact member being secured by the screw 99. One end of the contact member 98 is normally in contact with the member 100 which is carried by the insulator 101 in the bracket 102 on the slide 78. The insulator 101 is secured in position by the screw 103 and the member 100 is secured by the nuts 104. An electric wire 105 is secured to the member 100 by means of the thumb nut 106, and an electric wire 107 is connected with the member 98 by means of the sleeve 108 and the screw 109.

A horizontally arranged lever 110 has one end mounted on a pivot 111 on the slide 78 and projects inwardly from said pivot so as to overlap the normal path of the free end of the finger 34. The inner end of the lever 110 is offset upwardly, as indicated at 110', to normally clear the fingers 34 as the latter are carried around by the table 10, and, adjacent its inner end, is provided with a downwardly extending arm 112, for a purpose to be hereinafter described. The arm 112 is set outwardly of the path of the fingers 34, so as to never interfere with the latter. A vertically arranged lever 113 mounted on an extension of the pivot 91 carries at its lower end a tooth 114, which is adapted to underlie a lateral extension 115 on the lever 110, to support the latter in the position shown in Fig. 6. The end of the tooth 114 and the edge of the extension 115 are beveled, as shown in Fig. 6, so that when the lever 110 is lifted, as hereinafter described, the lower end of the lever 113 will be deflected to the left, as seen in Fig. 6, and the engagement of the tooth 114 with the extension 115 will be restored.

The lever 113 carries an armature block 116 arranged in cooperative relation to a solenoid 117 which is supported by a bracket 118 on the bracket 102. The solenoid 117 is connected, by means of the electric circuit 119, to a source of current 120 and through the contacts 121 and 122, which may be of any suitable construction. The contact 121 is rigidly supported in a bracket 123 on the slide 78, while the contact 122 is supported upon the end of a lever 124 and insulated therefrom in the usual manner. The lever 124 is pivoted at 125 on the slide 78 and carries an armature block 126 with which a solenoid 127 cooperates. The solenoid 127 is supported by a bracket 128 on the slide 78 and is connected in circuit with the wires 105 and 107 and the source of current 129.

When the contacts 98 and 100 are together, current flows through the solenoid 127 and maintains the lever 124 in the position shown in Fig. 6, with the contacts 121 and 122 separated. However, when the block 75 is rocked on its pivot, by an article on the table 10, so as to lift the lever 90 and separate the contacts 98 and 100, the solenoid 127 will be deenergized and permit the lever 122 to drop, making a connection through the contacts 121 and 122 and causing the solenoid 117 to be energized and throw the lever 112 toward the left, as seen in Fig. 6, to release the lever 110 and permit the latter to fall onto the stop 130, in which position the inner end of the lever 110 will lie in the path of the fingers 34.

As the articles are being carried by the grippers 30 and 31 on the table 10 past the block 75, the action of the weight 81 will draw the slide 78 to the right, as seen in Fig. 6, and cause the block 75 to press firmly against the article so that the surface 75' will conform to the taper of the article, and if this taper varies from a predetermined standard, the block 75 will be rocked on its pivot 77 in one direction or the other and cause the contacts 98 and 100 to be separated, which, in turn, will cause the inner end of the lever 110 to be dropped into the path of the finger 34 so that the finger will engage with the end of the lever 110 and open the gripper 31 so as to release the article, which will then fall away from the block 26. It will be noted from Fig. 5, that the position of the inner end of the lever 110 is such that it will not be engaged by the finger 34 until the article has been advanced from its position in Fig. 5 to a position over the opening 131 in the shelf 45. In case the taper of the article being gauged does not vary from the predetermined standard sufficiently to cause the separation of the contacts 98 and 100, the lever 110 will not be tripped and the article will not be released as just described.

It is essential that the lever 110 be restored to the position indicated in Fig. 6 immediately after an article has been released, and for this purpose, there is provided, adjacent each of the fingers 34, a cam 132, which is carried by a bracket 133 on the under side of the table 10. The cam 132 has an inclined surface 134 adapted to engage the lower end of the extension 112 on the lever 110, so that as the cam passes under the inner end of the lever 110, due to the revolution of the table 10, the surface 134 will cause the lever 110 to be lifted to the position shown in Fig. 6, and when it has been lifted to this position, the tooth 114 on the lever 113 will automatically assume its position under the extension 115 and retain the lever 110 in its restored position. In the meantime, the article having passed out of contact with the block 75, the lever 90 will be permitted to drop to its normal position, as seen in Fig. 6, so as to complete the circuit through the contacts 98 and 100 and thereby energize the solenoid 127 which will lift the lever 124 and thereby separate the contacts 121 and 122 and deenergize the solenoid 117, so that when the lever 110 is lifted, as above described, the lever 113 will be free to move toward the right and hold the lever 110 in its restored position. With the parts thus restored to their normal positions, they are then ready to gauge the succeeding article, and if this article does not conform to the predetermined standard, the same sequence of operations will follow as above described.

After the articles have passed the taper gauging mechanism, as described, those which have not been discharged are then presented to a series of diameter gauging mechanisms for assorting them into different sizes. In Fig. 1, I have shown four such diameter gauging mechanisms, these being indicated by the letter D, but it will be understood that more or less of these diameter gauging mechanisms may be used and that, ordinarily, as many as eighteen or twenty may be desirable, and in Fig. 1, I have shown a machine adapted to employ twenty of such diameter gauging mechanisms. These diameter gauging mechanisms are illustrated in detail in Figs. 7, 8 and 9 and comprise a gauging block 135 which is slidably mounted in a member 136, the latter being also slidable in a base 137, which is supported on the shelf 45 and positioned thereon by a tongue 138 which fits into a groove 139 in the shelf. Screws 140 may be used to secure the base 137 in position. The member 136 has a downward extension 141 arranged in a slot 142 in the base 137, so as to be accurately guided thereby. At its outer end, the base 137 carries a plate 143 in which is journaled a micrometer screw 144, the inner end of which has a threaded connection with the extension 141, as indicated at 145. The plate 143 may be secured to the base 137 by screws 146 and 130 the screw 144 is held from endwise movement relative to the plate 143 by collars 147 and 148, the latter being graduated, as shown, for the purpose of facilitating adjustment. The screw 134 has a knurled head 149 at its outer end, by means of which it may be turned. When the member 136 has been adjusted, it may be secured in position by means of the screw 150, which projects through a radially elongated slot 151 in the base 137 and the shelf 45, as clearly shown in Fig. 9.

Figures 7, 8, 9:
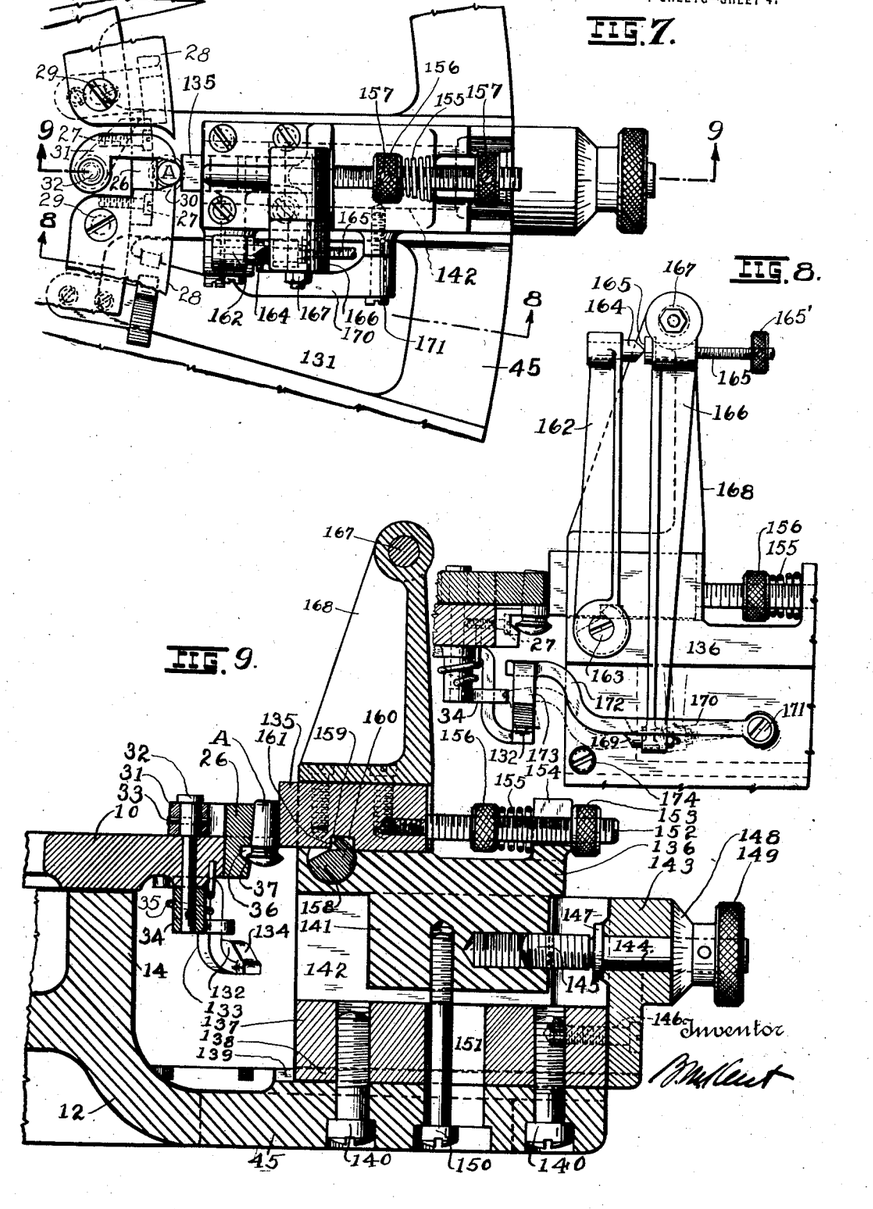
Fig. 7 is an enlarged fragment of Fig. 1, to illustrate one of the diameter gauging devices.
Fig. 8 is a section on the line 8—8 of Fig. 7.
Fig. 9 is a transverse section on the line 9—9 of Fig. 7.

The gauging block 135 has attached to its outer end a screw 152 on which there is a thumb nut 153 adapted to engage with the stop 154 on the member 136, for the purpose of limiting inward movement of the gauge block, this movement being effected by a spring 155 arranged between the inner side of the stop 154 and an adjustable nut 156 on the screw 152, which serves to vary the tension of the spring 155. The nuts 153 and 156 may be secured in any position to which they are adjusted, by the usual set screws 157. A shaft 158 is journaled in the member 136 and is cut away to form a knife edge 159, which projects into a slot 160 in the bottom of the gauge block 135 and contacts with the side 161 of said slot. An upwardly extending lever 162 is secured on the shaft 158 by a screw 163 and at its free end carries a pin 164 having a knife edge which contacts with the hardened head of the steel screw 165 which is carried by the lever 166 adjacent its pivot 167. The pivot 167 is supported by a bracket 168 on the member 136 and the lower end of the lever 166 carries a tooth 169 which supports a horizontally arranged lever 170 in a manner similar to that in which the tooth 114 supports the lever 110, the parts being similar and functioning in the same way, as above described. The screw 165 carries an adjustable counterweight 165' which is adapted to swing the lower end of lever 166, to effect the engagement of the tooth 169 with the lever 170.

The lever 170 has its outer end pivoted at 171 and has its inner end offset upwardly, as indicated at 172, and provided with a downward extension 173. When released by the tooth 169, the lever 170 is adapted to drop to the dotted-line position shown in Fig. 8, where it is supported by the stop 174. In this position, the inner end of the lever 170 will lie in the path of the finger 34 and intercept the latter in its movement with the table 10, so as to open the gripper 31 and release an article.

Each of the diameter gauging mechanisms is set to be actuated by articles which exceed a predetermined size and, as the gauging mechanisms are arranged so that the articles pass them in succession, the first mechanism will gauge the largest articles and each mechanism will gauge articles of a slightly smaller diameter than those gauged by the preceding mechanism.

As in the case of the taper gauging mechanism, the lever 170 is so positioned, with reference to the gauging block 135, that, although it will be tripped by the article as it passes the gauging block, the finger 34 will not be intercepted by the lever 170 until the article has advanced to a position over the adjacent opening 131 in the shelf 45. After the article has been released, the surface 134 of the cam 132 will engage the lower end of the extension 173 of the lever 170 and restore the latter to the full-line position shown in Fig. 8, so that the parts will then be ready to gauge the next succeeding article.

A circular shelf 175 is arranged beneath the shelf 45 and supported by brackets 176 on the legs 13, and on this shelf suitable receptacles 177 may be arranged beneath each of the openings 131, to receive the articles that drop therethrough.

Having thus described my invention, what I claim is:

1. In a gauging machine, a carrier, a gauging block and a pair of grippers having beveled faces on said carrier, resilient means for closing said grippers on an article, whereby said beveled faces force the article against said block, and gauging means in cooperative relation with said carrier.

2. In a gauging machine, a carrier, a gauging block and a pair of grippers having beveled faces on said carrier, resilient means for closing said grippers on an article, whereby said beveled faces force the article against said block, gauging means in cooperative relation with said carrier, and means controlled by said gauging means to open said grippers.

3. In a gauging machine, a carrier, a gauging block and a pair of grippers having beveled faces on said carrier, resilient means for closing said grippers on an article, whereby said beveled faces force the article against said block, gauging means in cooperative relation with said carrier, and means controlled by said gauging means for discharging said article.

4. In a gauging machine, a carrier having fixed jaws, each having a beveled face, and pivoted jaws having beveled faces opposing said first-named faces, respectively, means for forcing said pivoted jaws toward said fixed jaws, whereby an article to be gauged may be gripped, gauging members adjacent said carrier and adapted to be actuated by the adjacent article in said carrier, and means adapted to move the adjacent pivoted jaw to release the article when the gauging member is operated.

5. In a gauging machine, a series of gripping members each adapted to hold an article to be gauged, gauging means adapted to be actuated by said articles, means for moving said members successively into operative relation with said gauging means, and means actuated by said gauging means to move the adjacent gripping member to release the article held thereby.

6. In a gauging machine, the combination of a series of article-holders, each comprising a pair of members, one of which is pivoted and resiliently held toward the other to grip an article therebetween, a gauge, means for moving said holders successively into operative relation with said gauge, and means adapted to be actuated by said gauge to move the pivoted member of the adjacent holder and release said article.

7. In a gauging machine, a carrier, gripping means on said carrier adapted to hold an article to be gauged against movement therein, gauging means adjacent said carrier and adapted to be actuated by said article, and means actuated by said gauging means to release said gripping means.

8. In a gauging machine, a carrier, means mounted on said carrier for holding articles, and comprising a member on one edge thereof having a ledge, a member fixed on said carrier and extending beyond the first-mentioned member, a pivoted member, said fixed and pivoted members having opposed outwardly converging beveled faces adapted to grip the article, gauging means in operative relation with said carrier, and means operable by said gauging means to release said article-holding means.

9. In a device of the class described, the combination of a horizontally arranged table rotatable about a vertical axis, article-gripping means on said table adjacent the periphery thereof, taper and diameter gauging devices in operative relation to said means, and means controlled by said gauging devices for releasing the adjacent gripping means upon actuation of said gauging means.

10. In a gauging machine, the combination of a rotating table having a vertical axis, article-holders adjacent the periphery of said table adapted to hold articles to be gauged against movement thereon, gauging heads adjacent said table having their gauging surfaces extending vertically, and means actuated by said gauging heads for ejecting said articles.

11. In a gauging machine, the combination of a rotating table having a circumferentially extending face, a gripper on said table having a face extending outward beyond said first-named face, a pivoted member adjacent said gripper and having a face opposed to and cooperating with the face of said gripper, one of said faces being beveled, resilient means for forcing said pivoted member toward said head whereby an article to be gauged may be gripped, and gauging means adapted to be actuated by said article whereby said pivoted member is moved to releasing position and the article is ejected.

12. In a gauging machine, a rotating article carrier having circumferentially extending ledges, a gripper member on said carrier extending radially beyond said ledges and having a beveled face, a pivoted gripper, means for resiliently forcing said pivoted member toward said first-mentioned gripper, whereby an article may be gripped by said member with its end resting on one of said ledges, and gauging means adjacent said carrier adapted to actuate said pivoted member to release said article.

13. In a gauging machine, the combination of a rotatably mounted carrier having article-holding means adjacent the periphery thereof, a frame, a slide mounted on said frame and movable radially of said carrier, a stop member for limiting the inward motion of said slide, means yieldably resisting outward motion of said slide, a gauge carried by said slide in operative relation with said article-holding means, and means actuated by said gauge for ejecting articles from said article-holding means.

14. In a gauging machine, an article carrier, means for holding the article against movement on said carrier, a plurality of gauges with which the articles are caused to cooperate in succession, and means controlled by said gauges for discharging the article from said carrier.

15. In a gauging machine, an article carrier, means for holding the article against movement on said carrier, a plurality of gauges with which the articles are caused to cooperate in succession, and means controlled by said gauges for actuating said holding means to release the article.

16. In a gauging machine, an article carrier, means for holding the article against movement on said carrier, a plurality of gauges with which the articles are caused to cooperate in succession, and electro-magnetic means controlled by one of said gauges for discharging the articles from said carrier.

17. In a gauging machine, a series of article-holders, a taper gauge, a diameter gauge, means for moving said article-holders successively into operative relation with said gauges, and means operable by said gauges for discharging articles from the adjacent article-holder.

18. In a gauging machine, the combination of a series of article-holders, a taper gauge having a movable head, a plurality of diameter gauges having movable heads, means for moving said article-holders successively into co-operative relation with each of said heads, and means operable by each head to discharge the article from the adjacent article-holder.

19. In a gauging machine for gauging the taper of articles, a series of article-holders, a gauge adapted to be actuated by a tapered article whose taper differs more than a predetermined amount from a given taper, means for moving said article-holders successively into operative relation to said gauge, yielding means for allowing separation of said gauge and adjacent article-holder bodily without actuation of said gauge, and means adapted on actuation of said gauge to eject the article from the adjacent article-holder.

20. In a gauging machine, a gauge adapted to be actuated by a tapered article whose taper differs more than a predetermined amount from a given taper, an article-holder adapted to move an article into operation with said gauge, means operable by said gauge for ejecting said articles, and resilient means for allowing relative motion of said gauge and article-holder without actuation of said ejecting means.

21. In a gauging machine, the combination of a table having article-holders thereon, of a taper gauge having a movable head adjacent said table, a plurality of diameter gauges having movable gauging heads at progressively smaller distances from the circumference of said table, and means operable by said heads for discharging articles from the article-holders while adjacent said heads, whereby said articles may be gauged, as to taper and diameter, as said table is rotated.

22. In a machine for gauging tapered articles, the combination of an article-carrier, a mechanism arranged in cooperative relation to said carrier adapted to be actuated by variation in the taper of the articles, a plurality of devices adapted to be actuated by articles of different diameters, and means associated with said mechanism and said devices and separately controlled thereby to cause the discharge of the articles from said carrier.

23. In a gauging machine, a gauge, a carrier adjacent thereto, an article-holder thereon, including a pivoted gripping member, a finger on said member, means for normally holding said gripping means in gripping position, and means controlled by said gauge for interposing an actuating member into the path of said finger, whereby said article may be released from said holder.

24. In a gauging machine, a gauge, a carrier adjacent thereto, an article-holder thereon, including a pivoted gripping member, a finger on said member, means for normally holding said gripping means in gripping position, and electro-magnetic means controlled by said gauge for interposing an actuating member into the path of said finger, whereby said article may be released from said holder.

25. In a gauging machine, a gauge, a carrier adjacent thereto, article grippers on said carrier, a finger on one of said grippers, means for holding said grippers in closed position, an actuating cam, and means controlled by said gauge, whereby said cam may be moved into the path of said finger to open said grippers.

26. In a gauging machine, an article-carrier, a pivoted gauging block, electrical contact members, one of them operatively connected to said block and separated from the other member when said block moves a predetermined amount in either direction about its pivot axis, and means controlled by separation of said contact members to release the article from said carrier.

27. In a gauging machine, a gauge, a carrier adjacent thereto, article-holders thereon including a pivoted gripping member, said carrier being adapted to move said holders successively into operative relation with said gauge, means for normally holding said gripping means in gripping position, an operating member adjacent said gauge and adapted to be controlled thereby to effect the release of the article from said gripping means, and means on said carrier for restoring said operating member to inoperative position.

28. In a gauging machine, a gauge, a carrier adjacent thereto, an article-holder thereon including a pivoted gripping member having an actuating finger, said carrier being adapted to move said holder into operative relation with said gauge, means for normally holding said gripping means in gripping position, and means controlled by said gauge including a member movable into the path of movement of said finger, whereby an article may be released from said holder.

29. In a gauging machine, a gauge, a rotating table adjacent thereto, an article-holder thereon including a pivoted gripping member having its pivot extending through said table, a finger on said pivot, a member normally held out of the path of said finger, and means controlled by said gauge for positioning said member in the path of said finger for releasing said grippers.

30. In a gauging machine, a gauge, a rotating table adjacent thereto, an article holder thereon including a pivoted gripping member having its pivot extending through said table, a finger on said pivot, a member normally held out of the path of said finger, means controlled by said gauge for positioning said member in the path of said finger for releasing said grippers, and means on said table for restoring said member to normal position.

31. In a gauging machine, a gauge, a carrier adjacent thereto, an article-holder thereon including a pivoted gripping member having a finger, means for resiliently holding said gripper in closed position, a lever adjacent said gauge having a portion adapted to project into the path of said finger, supporting means for holding said lever out of the path of said finger, and means controlled by said gauge for withdrawing said supporting means, whereby said lever moves into the path of said finger to release said article.

32. In a gauging machine, a gauge, a rotating table adjacent thereto, an article-holder on said table, including a pivoted gripping member normally held in gripping position, a finger connected to said member, a lever adapted when in operative position to extend into the path of said finger, supporting means to hold said member in inoperative position, and means controlled by said gauge for withdrawing said support.

33. In a gauging machine, a gauge, a rotating table adjacent thereto, an article-holder on said table, including a pivoted gripping member normally held in gripping position, a finger connected to said member, a lever adapted when in operative position to extend into the path of said finger, supporting means to hold said member in inoperative position, means controlled by said gauge for withdrawing said support, and means on said carrier for restoring said lever to normal position.

In testimony whereof I affix my signature.

BERT M. KENT.